United States Patent [19]
Cremer et al.

[11] 3,818,759
[45] June 25, 1974

[54] DEVICE FOR DISCONTINUOUSLY MEASURING THE LEVEL OF LIQUID METAL SUPPLIED TO A CONTAINER

[75] Inventors: Dieter Cremer, Steinenbruck; Rainer Hans, Bensberg, both of Germany

[73] Assignee: Interatom Internationale Atomreaktorbau GmbH, Bensberg/Koln, Germany

[22] Filed: Aug. 31, 1972

(Under Rule 47)

[21] Appl. No.: 285,310

[30] Foreign Application Priority Data
Sept. 3, 1971 Germany............... 7133639[U]

[52] U.S. Cl.............. 73/290 R, 73/DIG. 5, 336/30
[51] Int. Cl. .......................................... G01f 23/06
[58] Field of Search .......... 73/290 R, 304 R, 362 R; 336/136, 30

[56] References Cited
UNITED STATES PATENTS

| | | | |
|---|---|---|---|
| 2,776,563 | 1/1957 | Holbert | 73/290 R X |
| 3,058,345 | 10/1962 | Mastras | 73/304 R |
| 3,157,048 | 11/1964 | Williams | 73/304 R |
| 3,402,607 | 9/1968 | Cambillard et al. | 73/304 R |
| 3,678,748 | 7/1972 | Dziedzic | 73/290 R |

*Primary Examiner*—Richard C. Queisser
*Assistant Examiner*—Daniel M. Yasich
*Attorney, Agent, or Firm*—Herbert L. Lerner

[57] ABSTRACT

Exchangable device for discontinuouly measuring the level of liquid metal in a container in accordance with induction principles includes a casing tube insertable into a container adapted to receive liquid metal therein, a casing tube flange tightly connected to the casing tube and tightly connectible to a flange formed on the container, at least one coil core mounted in the casing tube, the coil core being formed of a material selected from the group consisting of soft iron and austenitic iron and steel, at least one primary and one secondary coil mounted on the coil core the primary and secondary coil together forming a measurement sensor, the primary coil being energizable by a constant intermediate frequency alternating current for inducing a monitorable voltage in the secondary coil variable in value in accordance with the absence or presence of liquid metal at the level of the measurement sensor, a spacer tube of given length received in the casing tube and connected at one end thereof to the coil core, and a plug member sealingly secured to the casing tube flange and connected to the other end of the spacer tube.

5 Claims, 6 Drawing Figures

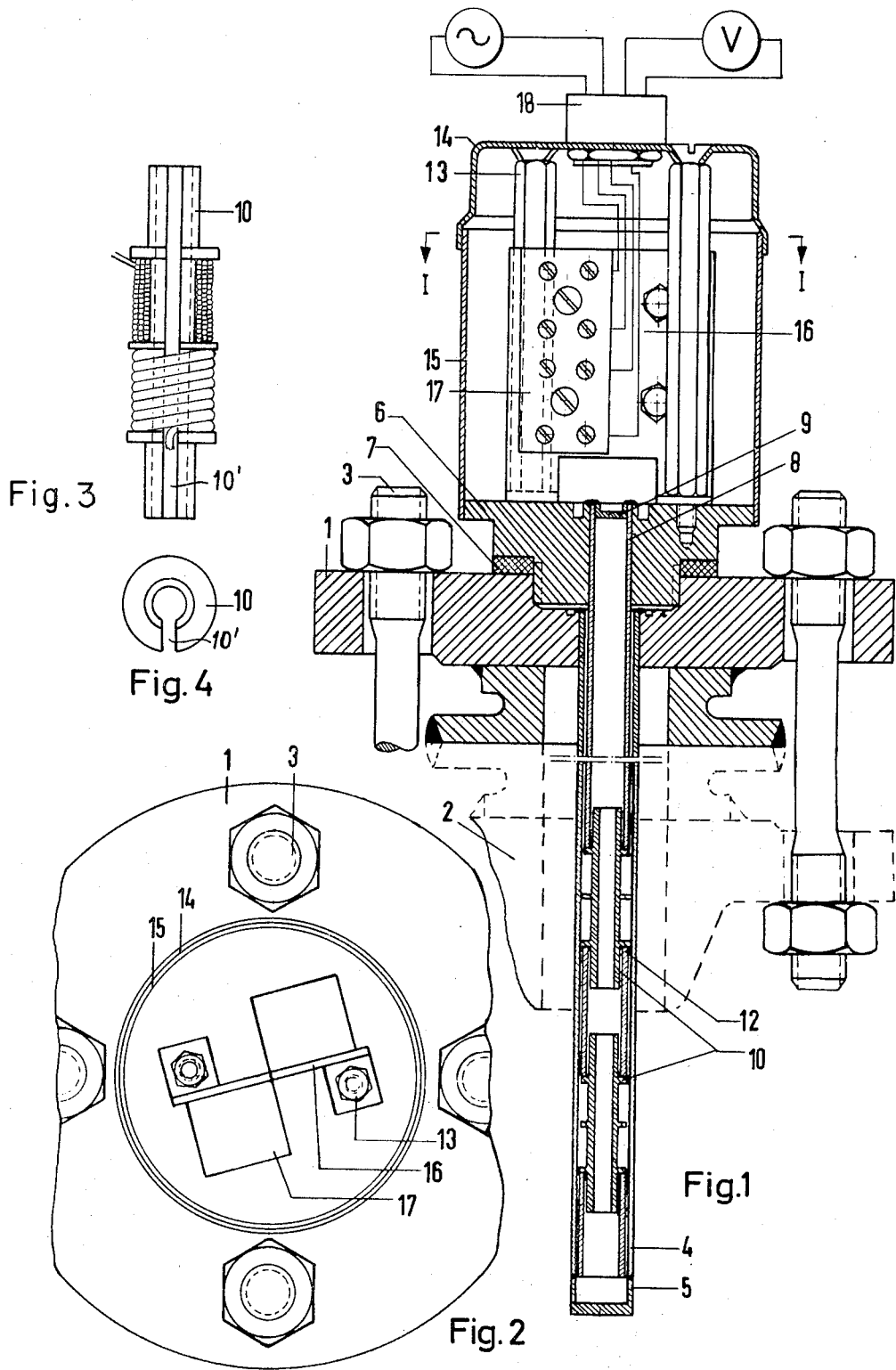

DEVICE FOR DISCONTINUOUSLY MEASURING THE LEVEL OF LIQUID METAL SUPPLIED TO A CONTAINER

The invention of the instant application relates to an exchangeable device for discontinuously measuring the level of liquid metal in a container in accordance with induction principles and, more particularly, such device wherein two coils comprising a primary and a secondary coil are provided as each measurement sensor, the primary coil being energizable by a constant intermediate frequency alternating current for inducing a monitorable voltage in the secondary coil that is variable in value in accordance with the absence or presence of liquid metal at the level of the measurement sensor. Devices for continuously measuring the level of liquid metal have been known heretofore, for example, from German Pat. Nos. 1,178,615 and 1,210,998. In many cases, it is sufficient, however, to be capable of monitoring only one or a few desired levels of the liquid metal.

The physical principle of inductive measuring of liquid levels is known. A measurement sensor is formed of two coils, of which a primary coil is energized by a constant intermediate-frequency current and forms a magnetic field. This field induces a voltage in a secondary coil of the two coils. When the coils are immersed in a liquid metal, eddy currents are produced by the alternating magnetic field which weaken the inductive effect and consequently produce a variation in the induced secondary voltage. This variation is electronically monitored and releases a signal. It is essential for the security and accuracy of the measurement that the frequency and the current be of such value that the magnetic field attains an adequately large depth of penetration into the liquid metal so that no faulty measurements is possible even when oxides are deposited on the measurement sensor or a thin layer of liquid metal has condensed thereon.

It is accordingly an object of the invention to provide an exchangeable device for discontinuously measuring the level of liquid metal having nearly any desired disposition of measurement sensors, which is pressure-tight and thermo-resistant and, when soiled for example by oxide or condensed liquid metal, indicates or responds without disturbance.

With the foregoing and other objects in view, there is provided, in accordance with the invention, exchangeable device for discontinuously measuring the level of liquid metal in a container in accordance with induction principles, comprising a casing tube insertable into a container adapted to receive liquid metal therein, a casing tube flange tightly connected to the casing tube and tightly connectible to a flange formed on the container, at least one coil core mounted in the casing tube the coil core being formed of a material selected from the group consisting of soft iron and austenitic iron and steel, at least one primary and one secondary coil mounted on the coil core the primary and secondary coil together forming a measurement sensor, the primary coil being energizable by a constant intermediate frequency alternating current for inducing a monitorable voltage in the secondary coil variable in value in accordance with the absence or presence of liquid metal at the level of the measurement sensor, a spacer tube of given length received in the casing tube and connected at one end thereof to the coil core, and a plug member sealingly secured to the casing tube flange and connected to the other end of the spacer tube.

With this construction, the casing tube can remain tightly welded at the measuring location, for example in the form of a blind-end tube, i.e., a tube closed at the end thereof extending into the container, while the measurement sonde, which is formed of several measurement sensors, is installed or exchanged. The measurement sensors which are respectively formed of a coil body having respective primary and secondary coils, can be disposed at virtually any desired level. The gas-tight connection of the plug member to the vessel flange has the advantage, on the one hand, that no gas exchange with the surroundings occurs with temperature changes in the casing tube and, on the other hand, no liquid metal escapes from the measurement sonde if the casing tube is damaged.

In accordance with another feature of the invention a plurality of pins are provided which extend tangentially to the coil core through corresponding bores formed therein and in the space tube for connecting the coil core to the spacer tube.

Such tangential pins are installable rapidly and simply, secure the connection against torsion. They are protected by the casing tube against being dislodged, and do not reduce the interior cross section of the coil core and the spacer tube that is available for withdrawing the coil wires therethrough.

Devices for measuring liquid levels in accordance with the invention are suited for liquid metals such as, for example, liquid sodium in nuclear power plants at temperatures to 650° C or to a maximal pressure of 13 atmospheres excess pressure at 600° C. Although the coil bodies may be formed of soft iron, by employing austenitic coil bodies, they are also suited for very high temperatures. For a casing tube having an outer diameter of 12 mm, a maximum of four measurement sensors can be disposed one above the other, a minimum spacing being necessary between the measuring locations. The measuring sondes according to the invention are presently being produced up to a length of 5m, an outer auxiliary means of fastening the casing tube being required for lengths greater than 2 to 3 m. The measurement accuracy is 1 mm within the range of 200° to 650° C.

Although the invention is illustrated and described herein as embodied in device for discontinuously measuring the level of liquid metal supplied to a container it is nevertheless not intended to be limited to the details shown since various modifications and structural changes may be made therein without departing from the spirit of the invention and within the scope and range of equivalents of the claims.

The construction and method of operation of the invention, however, together with additional objects and advantages thereof will be understood from the following description of specific embodiments when read in connection with the accompanying drawings, in which:

FIG. 1 is a longitudinal sectional view of one embodiment of a measuring sonde or probe including a vessel flange and a casing tube;

FIG. 2 is a cross-sectional view of FIG. 1 taken along the line I — I in the direction of the arrows;

FIGS. 3 and 4 are enlarged longitudinal and end views, respectively, of a coil body forming part of the embodiment of FIG. 1.

Figures 5, 6:
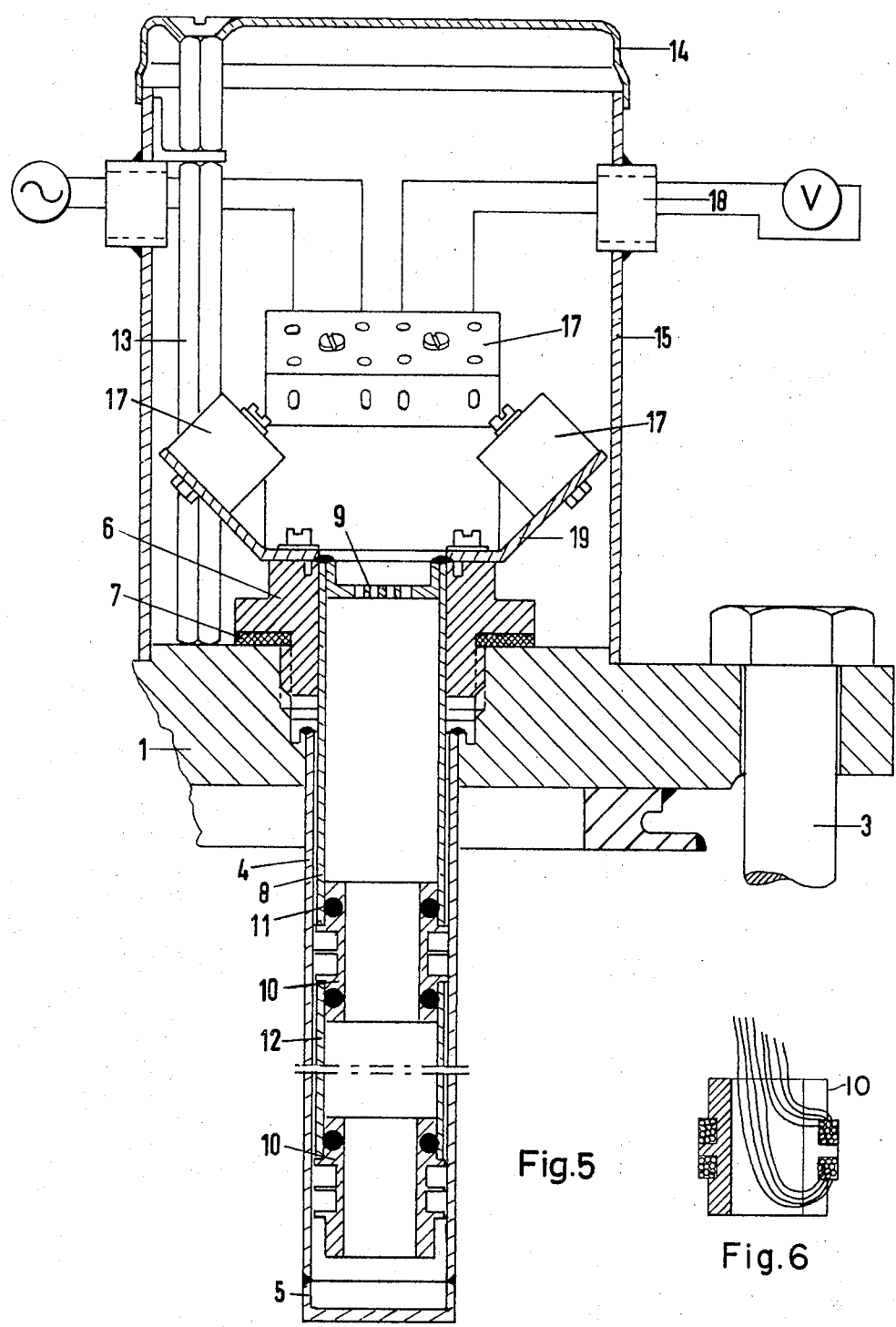
FIG. 5 is a view similar to that of FIG. 1 of another embodiment of the invention having a casing tube of treater diameter than that of the embodiment of FIG. 1.
FIG. 6 is a partial sectional view of the sensor comprising a coil core, a primary coil and a secondary coil wound on the coil core, with the ends of the wires withdrawn upwardly out of the spacer tube through bores in the spacer tube closure member.

Referring now to the drawing and first, particularly, to FIGS. 1 and 2 thereof, there are shown therein a casing tube flange 1 which is welded and threadedly secured by bolts 3 to a flange 2 of a vessel illustrated fragmentarily with dotted lines. A thin-walled casing tube 4 has an upper end, as viewed in FIG. 1, that is pressure-tightly welded to the casing tube flange 1, and a lower end that is pressure-tightly welded to an end piece 5. A plug member 6 is threaded into the casing tube flange 1, and is sealed with respect to the casing tube flange 1 by means of an annular seal 7. A spacer tube 8 is inserted into the plug member 6 and is welded at the upper end thereof, as viewed in FIG. 1, both to the plug member 6 as well as to a spacer tube closure member 9. The spacer tube 8 carries a coil body 10 at the lower end thereof, as viewed in FIG. 1, and is connected to the spacer tube 8 by non-illustrated pins. The coil body 10 is shown in enlarged view in FIGS. 3 and 4. The coil body 10 carries at the lower end thereof, as viewed in FIG. 1, another spacer tube 12 on which another coil body 10 as well as further spacer tubes and coil bodies can be secured. By varying the length of the spacer member 12, the spacing of the coil bodies 10 and consequently the height or level of the measuring sensor can be adjusted to almost any desired value. The measuring sensor comprises a primary and a secondary coil of metal-sheathed wires respectively wound on the coil bodies 10, the ends of the wires being withdrawn upwardly out of the spacer tube 8. The spacer tube closure member 9 is formed with several bores corresponding in number to the quantity of wires that are to be drawn out of the spacer tube 8, and is welded firmly to these metal-sheathed wires. Two spacer screws 13 are threadedly secured to the closure member 6 and serve for fastening a cap or hood 14 and an intervening cylindrical casing 15 to the closure member 6. The two spacer screws 13 serve simultaneously for fastening to the closure member 6 a clamp holder 16 to which several ceramic clamps 17 for electrical terminals of the coil wires are secured. A commercially available threaded joint 18 through which a connecting cable can be passed is provided in the cap 14.

In FIGS. 3 and 4, the coil body 10 of FIG. 1 is shown in enlarged longitudinal and end views, respectively. This coil body 10 is a hollow cylindrical member of rotationally symmetrical structure, and is formed with a longitudinal slot 10' which extends radially inwardly to the hollow interior thereof in order to provide simplified assembly of the coil wires. This coil body 10 is tangentially bored and pinned to the spacer tubes 8 and 12 of FIG. 1.

FIG. 5 shows another embodiment of the device for measuring the level of liquid metal supplied to a container in accordance with the invention of the instant application, wherein the outer diameter thereof is greater than that of the embodiment of FIG. 1. The embodiment of FIG. 5 therefore affords the installation of a greater number of connecting wires and thereby also a greater number of measuring sensors therein than does the embodiment of FIG. 1. Moreover, the mechanical strength of the embodiment of FIG. 5 is accordingly greater than that of the embodiment of FIG. 1. In addition, a plurality of tangentially extending pins 11 are provided in the embodiment of FIG. 5 which connect the coil body 10 to the spacer tubes 8 and 12 by suitably extending through corresponding bores formed therein. Also, as seen in FIG. 5, the clamp holder 19 has a different construction from that of the clamp holder 16 of the embodiment of FIG. 1.

We claim:

1. A replaceable probe device for use in measuring the level of liquid metal in a container in accordance with induction principles, comprising in combination, a single casing tube insertable into a container, said container adapted to receive liquid metal therein, a casing tube flange tightly connected to said casing tube and tightly connectable to a flange formed on the container, at least one coil core means mounted in said casing tube, said coil core means being formed of a material selected from the group consisting of soft iron and austenitic iron and steel, at least one primary and one secondary coil mounted on said coil core means said primary and secondary coil together forming a measurement sensor, said primary coil being energizable by a constant intermediate-frequency alternating current source for inducing a monitorable voltage in the secondary coil variable in value in accordance with the absence or presence of liquid metal at the level of the measurement sensor, means for spacing the coil core means including at least one spacer tube of selected length connected in the casing tube to said core means and a plug member sealingly secured to said casing tube flange and connected to one end of said spacer tube, the other end of the spacer tube connected to one end of the coil core means, to dispose the coils mounted on the core means at about the level of the liquid metal to be indicated.

2. Device according to claim 1 including at least another spacer tube and another coil core carrying a primary and a secondary coil to form another measurement sensor for independently measuring the level of liquid metal at a different height, said other spacer tube being connected at its upper and lower ends to and between said first-mentioned coil core and said other coil core.

3. Device according to claim 1 including a plurality of pins extending tangentially to said coil core through corresponding bores formed therein and in said space tube for connecting said coil core to said spacer tube.

4. Device according to claim 1 including a closure member at said one end of said spacer tube and formed with at least one opening through which wire ends of said primary and secondary coils sealingly extend out of said spacer tube.

5. Device according to claim 1 having a plurality of measurement sensors disposed vertically one above the other in said casing tube with each measurement sensor separated from the next measurement sensor by a spacer tube, each measurement sensor for measuring the level of the liquid metal in the container at a different height.

* * * * *